United States Patent [19]

Cremerius

[11] Patent Number: 5,297,719
[45] Date of Patent: Mar. 29, 1994

[54] METHOD OF PRODUCING THE INNER PART OF A TRIPOD JOINT

[75] Inventor: Rolf Cremerius, Bonn, Fed. Rep. of Germany

[73] Assignee: GKN Automotive AG, Siegburg, Fed. Rep. of Germany

[21] Appl. No.: 978,136

[22] Filed: Nov. 18, 1992

[30] Foreign Application Priority Data

Nov. 19, 1991 [DE] Fed. Rep. of Germany ....... 4137988

[51] Int. Cl.$^5$ .............................................. B23K 20/12
[52] U.S. Cl. ..................................... 228/114; 228/177; 228/173.4; 156/304.5; 29/237; 403/361
[58] Field of Search ...................... 228/112, 114, 173.4, 228/177, 185, 203, 265; 156/73.5, 304.5; 29/237, 451; 403/361; 285/150, 286

[56] References Cited

U.S. PATENT DOCUMENTS

| | | | |
|---|---|---|---|
| 2,257,335 | 9/1941 | Evans et al. | 228/173.4 |
| 3,886,649 | 6/1975 | Simon | 228/265 |

FOREIGN PATENT DOCUMENTS

| | | | |
|---|---|---|---|
| 0006586 | 1/1980 | European Pat. Off. | 228/173.4 |
| 0115232 | 8/1984 | European Pat. Off. | |
| 0127187 | 6/1987 | Japan | 228/173.4 |

Primary Examiner—Samuel M. Heinrich
Attorney, Agent, or Firm—Harness, Dickey & Pierce

[57] ABSTRACT

A method of producing inner parts of a tripod joint followed by a tubular shaft has one end of the tubular shaft deformed in a non-chip-forming way. The deforming increases the wall thickness. Radial arms are connected to the thickened region of the tubular shaft end, preferably by friction welding.

12 Claims, 3 Drawing Sheets

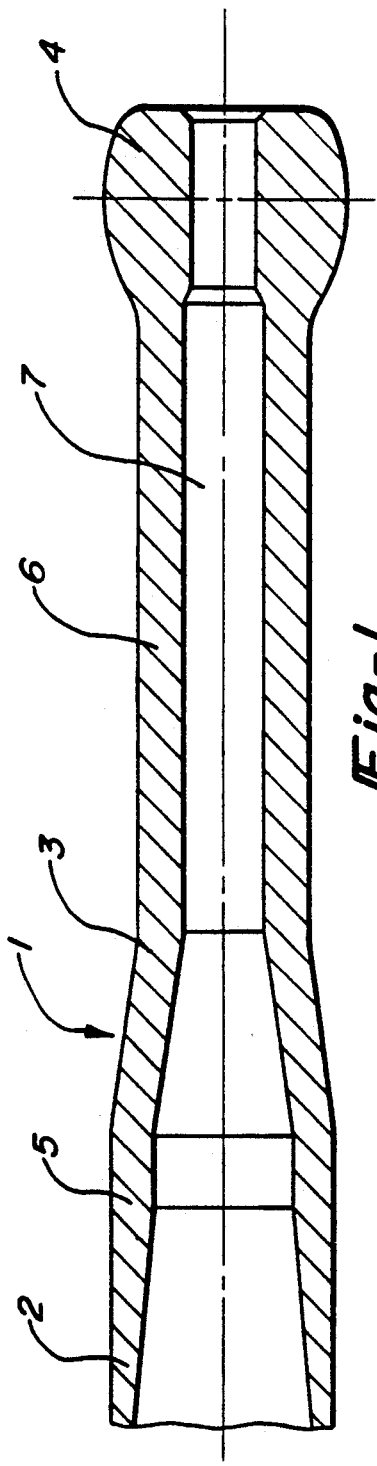
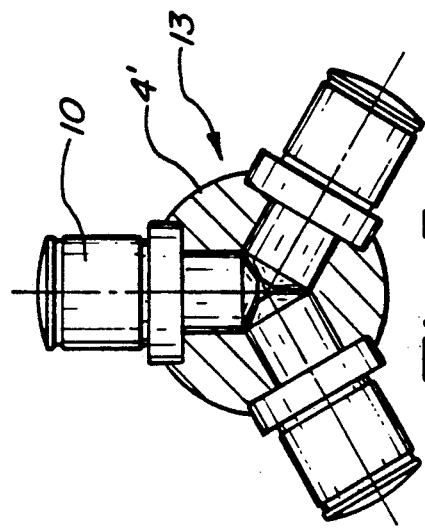
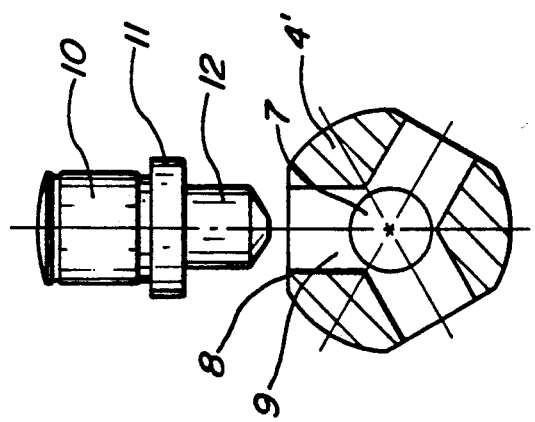

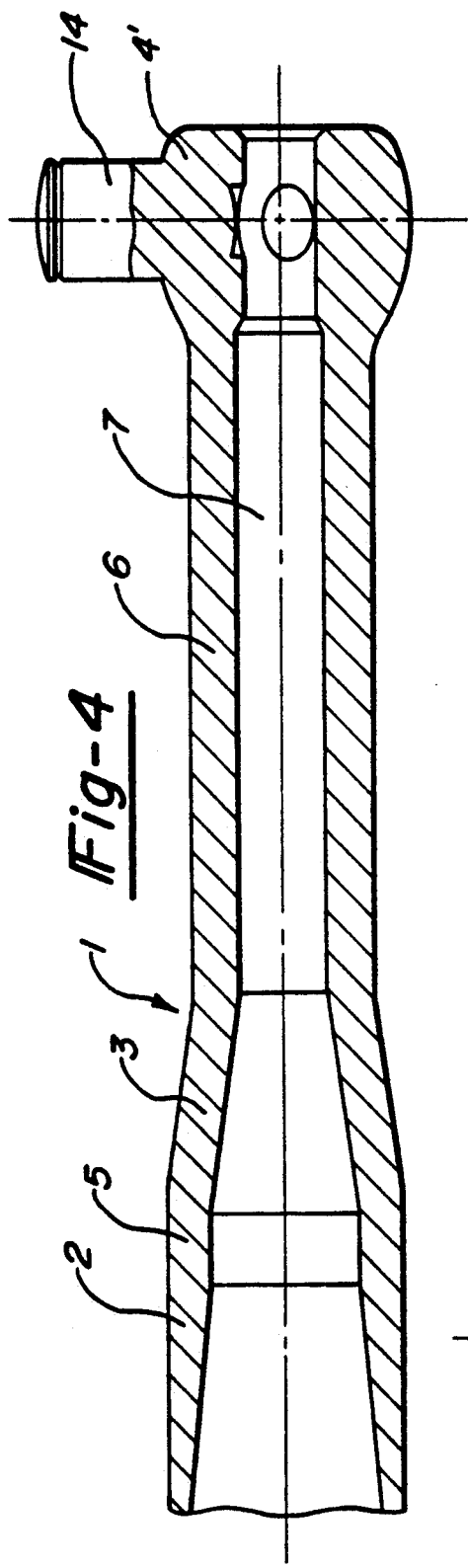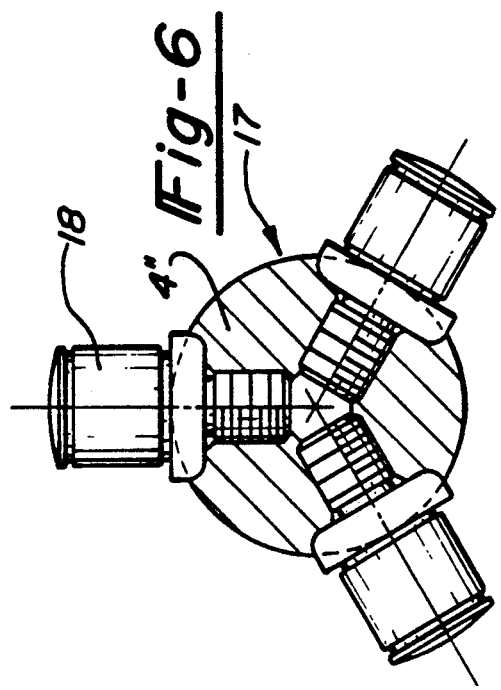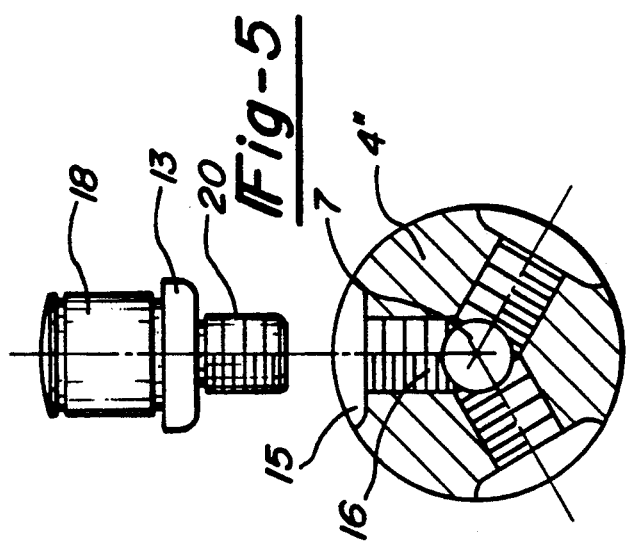

5,297,719

METHOD OF PRODUCING THE INNER PART OF A TRIPOD JOINT

BACKGROUND OF THE INVENTION

The present invention relates to a method of producing inner parts of a tripod joint. The inner parts include radial arms followed by a tubular shaft.

It is common practice to produce inner parts of tripod joints by forging or forming the parts with an annular member with inner teeth and subsequent, integrally producing radial arms to receive tripod rollers. An externally toothed tubular shaft is inserted into the inner teeth and axially secured by securing means to the annular member. Furthermore, it is known to form inner parts with an annular member and integral radial arms and to connect the annular member, via an end face, to a tubular shaft by welding. Friction welding is a particularly suitable process for this type of connection. At its end facing away from the tubular shaft, the annular member may be closed by a bottom part. Both above types of forming are described in EP 0 115 232 B1, published Aug. 8, 1984. Machining of the inner parts of both the above described joint designs is relatively complicated since they include three joint arms with deviating axes.

The first mentioned method has a weak point in the region where the arms are connected to the internally toothed annular member. This weak point is due to the joint size and its relatively small wall thickness. In addition, it is relatively expensive to produce the teeth on the tubular shaft end and in the annular member.

When selecting material for the inner joint part of the second above mentioned method, a compromise must be made between the wear resistance of the arms and the mechanical load bearing capacity of the inner part, e.g. fracture strength, of the annular member.

SUMMARY OF THE INVENTION

It is an object of the present invention to provide a method which enables the inner part of a tripod joint, with a subsequent tubular shaft, to be produced cost-effectively and with an improved quality.

The objective is achieved by deforming, in a non-chip forming way, one end of the tubular shaft. This deforming increases the wall thickness and, in the thickened region, the radial arms are connected to the tubular shaft end. By thickening the material, it is possible to achieve a much greater strength in the region of the arm base as compared to the teeth insertion solution. By integrating the tubular shaft and the annular member of the inner joint part, this eliminates the connection in the region of the tubular shaft. Also, individual arms may be produced of a higher quality material and are easier to machine.

To thicken the tubular shaft end, known round hammering, upsetting or forging process techniques may be used. These processes will not be described in greater detail. The selected process enables separate heat treatment of the tubular shaft on the one hand and, prior to the connecting operation, of the arms on the other hand. Thus, the tubular shaft may be optimized with respect to its mechanical load bearing capacity and the arms optimized with respect to the wear resistance of their surfaces. In preparation for connection, the thickened region of the tubular shaft end may be provided with three faces which extend tangentially relative to the tubular shaft member, preferably, and optionally in combination with three radial countersunk regions or bores.

According to a first possibility, the arms may abut the faces and may be secured by friction welding. Also, it may be advantageous to provide the arms with axial extensions or shoulder faces. The shoulder faces are inserted into the countersunk regions or bores and connect in the region by friction welding. In the case of friction welding, heat treatment of the surfaces may be restricted to the region of the external arm parts, whereas a tougher arm extension of the above shape establishes the connection with the thickened region of the tubular shaft end.

According to further embodiments it is possible to produce the arms as described above and solder them into countersunk regions and/or bores. Also, the arms and bores may be threaded around the corresponding threads and threaded together.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are illustrated in the drawings wherein:

FIG. 1 is a longitudinal cross sectional view of a tubular shaft end with a thickened portion in accordance with the invention.

FIG. 2 is an exploded partial cross sectional view of a tubular shaft end prepared for inserting an arm, as well as an individual arm.

FIG. 3 is a cross sectional view of a tubular shaft end according to FIG. 2, with the arm in the inserted condition.

FIG. 4 is a longitudinal cross sectional view through a tubular shaft end similar to that shown in FIG. 3.

FIG. 5 is an exploded partial cross sectional view of a second embodiment of a tubular shaft end and an individual arm.

FIG. 6 is a cross sectional view of a tubular shaft end according to FIG. 5, with the arm in the inserted condition.

DETAILED DESCRIPTION OF THE PREFERRED EMBODIMENT

Figure 7:
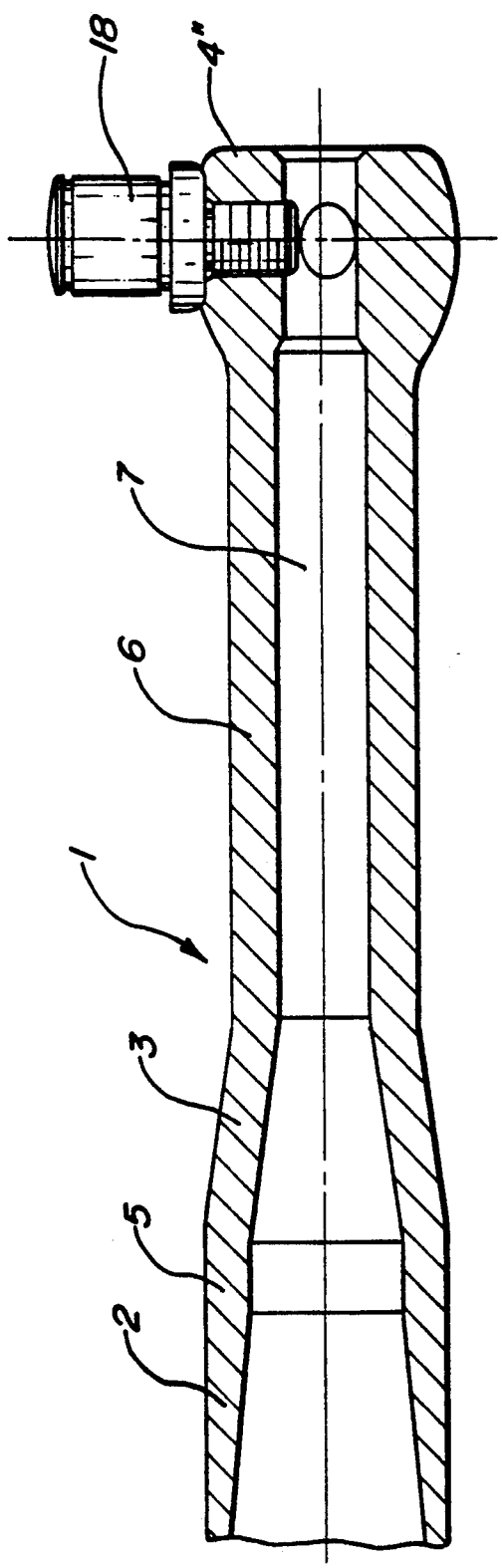
FIG. 7 is a longitudinal cross sectional view of a tubular shaft end according to FIG. 6.

FIG. 1 illustrates a tubular shaft end 1 with an internally conical region 2 for wall thickening purposes, a conical region 3 for diameter reducing purposes and an external part-spherical thickened region 4 at its outer end is located between the regions 2, 3. A short cylindrical portion 5 is located between the regions 3, 4. Also, longer cylindrical portion 6, with a smaller diameter is located between the regions 3, 4. The inner bore 7 of the tube continues with a reduced diameter as far as and into the thickened region 4.

FIG. 2 shows a partially machined thickened region 4' with the inner bore 7, three flattened regions 8, which reduce the originally round cross section, and three radial bores 9 starting from said flattened regions and arranged perpendicularly thereon. The flattened regions 8 and bores 9 are formed at angles of 120° with respect to one another. FIG. 2 also shows a joint arm 10 with a cylindrical portion. The joint arm 10 includes an enlarged collar region 11 and an adjoining insertion region 12. The parts illustrated are suitable for being connected by friction welding, soldering or gluing.

FIG. 3 illustrates three arms 10 inserted into the thickened region 4' of a completed outer joint part 13. The collar regions 11 abut and, at the same time, rest on the said flattened regions 8. In the regions marked by intersecting lines, the arms 10, by friction welding, are connected to one another in their insertion regions and to the thickened region 4' in the region of the collar regions 11. Instead of these welded regions it is also possible to provide soldered or glued regions produced by corresponding processes.

FIG. 4 shows the tubular shaft end and the same details as illustrated in FIG. 1, with radial arms 14 inserted into the thickened region 4'. The arms 14 deviate from the arms 10 shown in FIGS. 2 and 3 in that they do not include collar regions and do not contact one another in the region of insertion. The contour of the inserted arm 14 is not shown in greater detail inside the thickened region 4'.

FIG. 5 illustrates a cross-section through the thickened region 4''. The thickened region 4'' includes the inner aperture 7 and three circumferentially distributed countersunk regions 15. Radial threaded bores 16 start from the countersunk regions 15 and extend as far as the inner aperture 7. An arm 18 including a collar region 19 is fit into the countersunk region and a threaded journal 20, shown in the form of a detail, is threaded into the bore 16.

FIG. 6 shows a cross-section of a completed inner joint part 17. The joint part 17 includes three of joint arms 18 threaded into the thickened region 4'' until the collar region 9 abuts the countersink 15.

FIG. 7 illustrates a tubular shaft end, with the details already described in FIG. 1, and with arms 18 according to FIGS. 5 and 6 threaded into its thickened region 4,, While the above detailed description describes the preferred embodiment of the present invention, the invention is susceptible to modification, variation, and alteration without deviating from the scope and fair meaning of the subjoined claims.

I claim:

1. A method of producing an inner part of a tripod joint, comprising the steps of
   providing arms and a tubular shaft;
   deforming one end of the tubular shaft in a non-chip forming way by increasing the wall thickness of the shaft at the deformed end so as to form a thickened region at the deformed end;
   providing said thickened region with three circumferentially distributed connecting surfaces; and
   connecting the arms to the tubular shaft end at the connecting surfaces such that the arms are radially extending to the shaft axis.

2. A method according to claim 1, wherein said deforming step is round hammering.

3. A method according to claim 1, wherein the deforming step is forging.

4. A method according to claim 1, further comprising providing the arm selected from a material of a higher quality than the tubular shaft.

5. A method according to claim 1, wherein, prior to connecting the arms, at least the thickened region of the tubular shaft end is hardened.

6. A method according to claim 1, further comprising friction welding the arms to the tubular shaft end.

7. A method according to claim 6, wherein said three circumferentially distributed connecting surfaces are flat portions to which the arms are attached in the thickened region of the tubular shaft end.

8. A method according to claim 6, further comprising circumferentially distributed radial countersunk regions or bores into which the arms are inserted in the thickened region of the tubular shaft end.

9. A method according to claim 8, further comprising friction welding the inner ends of the arms positioned inside the tubular shaft end.

10. A method according to claim 1, further comprising soldering the arms into bores in the tubular shaft.

11. A method according to claim further comprising gluing the arms into bores in the tubular shaft.

12. A method according to claim 1, further comprising forming threaded bores in the tubular shaft and providing the arms with threaded portions and screwing the arms into the bores.

* * * * *